United States Patent
Huffman et al.

(10) Patent No.: US 6,897,991 B2
(45) Date of Patent: May 24, 2005

(54) DMD PIXEL WITH SMALL-ROTATED-MOVED VIA2 TO REDUCE BEAM-ELECTRODE SHORTS

(75) Inventors: James D. Huffman, Plano, TX (US);
Brian K. Dodge, McKinney, TX (US);
Mark K. Fletcher, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 89 days.

(21) Appl. No.: 10/357,179

(22) Filed: Feb. 3, 2003

(65) Prior Publication Data

US 2003/0156261 A1 Aug. 21, 2003

Related U.S. Application Data

(60) Provisional application No. 60/357,370, filed on Feb. 15, 2002.

(51) Int. Cl.[7] .............................................. G02B 26/08
(52) U.S. Cl. ........................................ 359/224; 353/99
(58) Field of Search .................................. 359/212, 213, 359/214, 215, 223, 224; 353/98, 99

(56) References Cited

U.S. PATENT DOCUMENTS 6,323,982 B1 * 11/2001 Hornbeck .................... 359/224
6,657,759 B2 * 12/2003 Muller ........................ 359/198

* cited by examiner

*Primary Examiner*—Mark A. Robinson
(74) *Attorney, Agent, or Firm*—Charles A. Brill; Wade James Brady, III; Frederick J. Telecky, Jr.

(57) ABSTRACT

A digital micromirror device with an optimized beam dimple formed over the via2 to provide process margin by increasing the clearance between the beam and the address electrode, thus reducing shorting between the two. This approach assures that when the beam tilts, it will land on its tips prior to making contact between the beam and address electrode, which are at different potentials. Beam dimple optimization is controlled by the characteristics of the via2 located on the lower metal-3 layer of the device.

16 Claims, 6 Drawing Sheets

DMD PIXEL WITH SMALL-ROTATED-MOVED VIA2 TO REDUCE BEAM-ELECTRODE SHORTS

This application claims priority under 35 USC §119(e)(1) of provisional application No. 60/357,370 filed Feb. 15, 2002.

FIELD OF THE INVENTION

The present invention relates to digital micromirror technology and more specifically reducing electrical shorts in these devices.

BACKGROUND OF THE INVENTION

The via2 structure in digital micromirror devices (DMD), which provides a connectivity path for connecting the underlying memory cells to their respective address electrodes on the metal-3 layer, can indirectly cause a dimple in the metal surface of the rotating beam. These dimples reduce the clearance between the beam and address electrode when the beam is rotated (tilted). This can result in the beam shorting to the address electrode.

FIG. 1 shows the build-up of a DMD starting with the memory layer 10, the metal-3 layer 11, the beam layer 12, and the mirror layer 13. The memory 10 is an array of binary cells 100 representing pixels. The metal-3 layer 11 is comprised of positive and negative beam address electrodes 110,111 and a beam landing pad plane 112. A thick oxide layer 101 isolates the metal-3 layer from the memory layer and also has via2 paths 102,103 connecting the memory's $Q$ and $\bar{Q}$ output signals to the positive and negative address electrodes 110,111 at contacts 113,115, respectively.

The beam layer 12 is comprised of a rotating beam 121 (also called yoke) attached by means of thin torsion hinges 120 to beam post caps 126, which are supported above the landing pad plane 112 on the metal-3 layer 11 by beam posts 127. Also on this layer are mirror address electrodes 123,124 supported above the beam address electrodes 110,111 by support posts 125,128 so that the beam and mirror address electrode pairs 110/123 and 111/124 are at the same $Q$ and $\bar{Q}$ potential, respectively. Finally, the highly reflective mirror 130 sits on top of the rotating beam 121, supported by the mirror post 131.

In operation, electrostatic forces cause the mirror/beam structure to rotate on its torsion axis, defined along the torsion hinges 120. These electrostatic forces are established by the voltage potential difference between the beam address electrodes 110/111 and the beam 121 and between the mirror address electrode 123/124 and the mirror 130, respectively. In each case, these forces are a function of the reciprocal of the distance between the two plates; e.g., 110/121 and 123/130. As the rigid beam/mirror structure rotates on its axis, the torsion hinges 120 resist deformation with a restoring torque that is an approximate linear function of the angular deflection of the structure. The structure rotates until either this restoring torsion beam torque equals the established electrostatic torque or until the beam/mirror structure is mechanically limited in its rotation, i.e., the beam tips 122 contact the landing pads 112. In typical DMD display applications, the structure is such that it is mechanically limited in its rotation (lands), so as to provide binary states at approximately +/−10° each.

Planarization, or smoothness of surfaces within the device is critical, both in the mirror for optical reasons and in the beam and other surfaces for reliability reasons. In fabricating these devices a sacrificial layer of appropriate thickness is deposited over the metal-3 layer and then the beam metal layer is fabricated over this sacrificial photoresist layer. The sacrificial layer is then removed freeing the beam structure 121 to rotate on it's torsion hinges 120 through a positive or negative angle until the beam tips 122 land on the landing pads 112. One problem in these type of devices is that when the beam metal is put down it will tend to follow the contour of the via2 transferred through the sacrificial photoresist layer, leaving an indent or dimple 140,141 in the beam over the via2 area once the sacrificial photoresist is removed, thus leaving a degradation in the beam planarity in these regions. These dimples can become sufficiently large that when the beam tilts, the dimple will contact the underlying beam address electrode, which is at a different electrical potential, before the beam tips land, thereby shorting out the device. This failure mechanism can significantly lower the yield of the devices.

What is needed is a device with very high beam planarity such that the beam tips are assured of landing prior to any other contact between device elements. The device of the present invention addresses the relationship between the dimples in the beam created over the via2s and assures that the clearance is such that these are much less likely to short out prior to the beam landing.

SUMMARY OF THE INVENTION

This invention discloses a digital micromirror device with an optimized beam dimple formed over the via2 to provide process margin by increasing the clearance between the beam and the address electrode, thus reducing shorting between the two. This approach assures that when the beam tilts, it will land on its tips prior to making contact between the beam and address electrode, which are at different potentials.

The beam dimple optimization is controlled in three areas to assure that there is adequate clearance between the beam and address electrode to prevent shorting from occurring. These include: the size of the via2, the location of the via2 relative to the device's rotational axis, and the orientation of the via2 relative to the device's rotational axis. More specifically, the solution involves making the via2 structure smaller, moving it closer to the middle of the beam, and rotating it relative to the rotational axis.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

This invention discloses a digital micromirror device with an increased clearance between the beam and the address electrode. This clearance improvement is accomplished by minimizing the effect of the dimple formed on the beam over the via2 located on the metal-3 layer, thereby improving the process margin and reducing the possibility of shorting between the beam and address electrode. This approach assures that when the beam tilts, it will land on its tips prior to making contact between the beam and address electrode, which are at different potentials.

The present invention relates to optimizing the characteristics of the via2 on the metal-3 layer to significantly improve the planarization of the beam metal, thereby reducing the possibility of shorts between the beam and address electrodes. The beam dimple optimization is controlled in three areas, all on the lower metal-3 layer, to assure that there is adequate clearance between the beam and address electrode to prevent shorts from occurring. These include: the size of the via2, the location of the via2 relative to the device's rotational axis, and the orientation of the via2 relative to the device's rotational axis.

Figure 1:
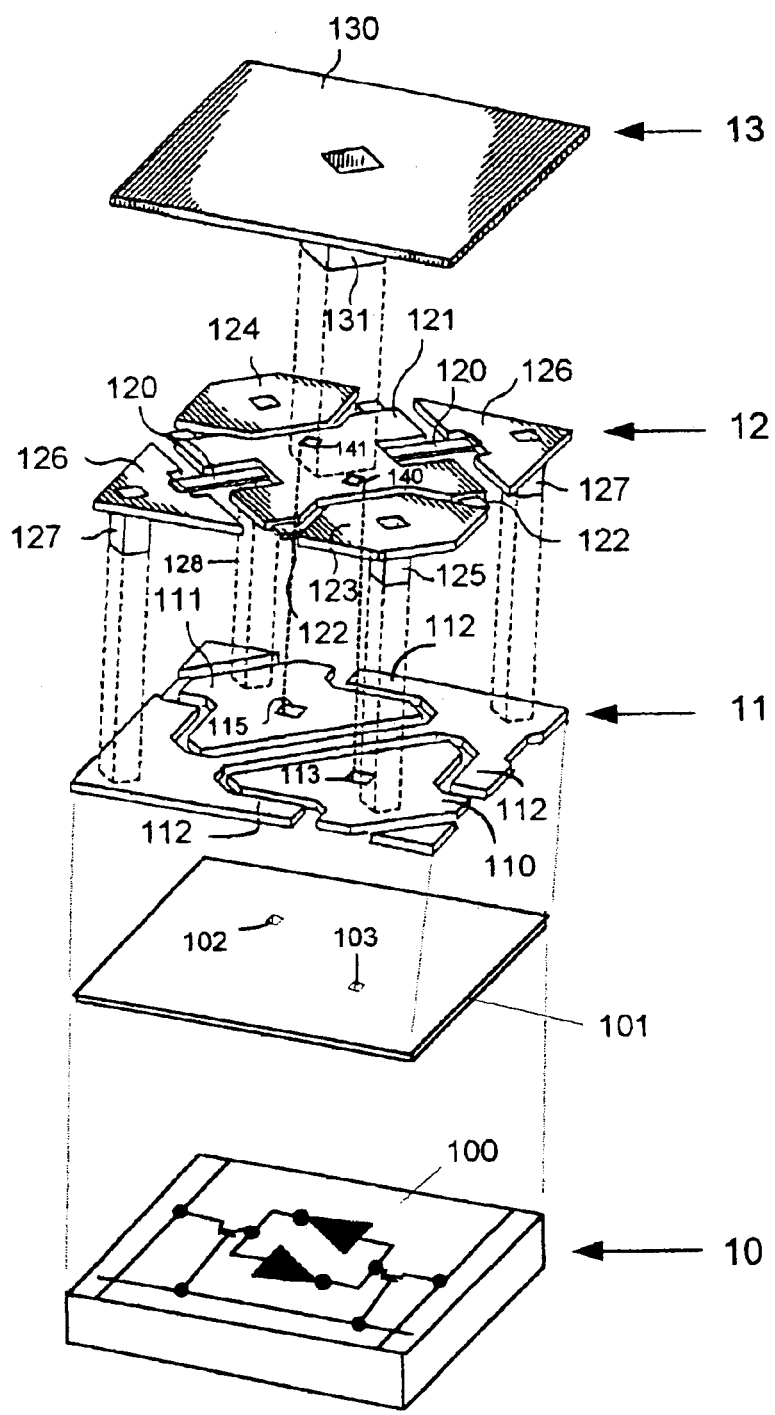
FIG. 1 is a perspective view of a digital micromirror device pixel showing a memory cell layer, a metal-3 address electrode and beam landing pad plane layer, a beam-torsion hinge structure and mirror address electrode layer, and a reflective mirror layer.
Figure 2:
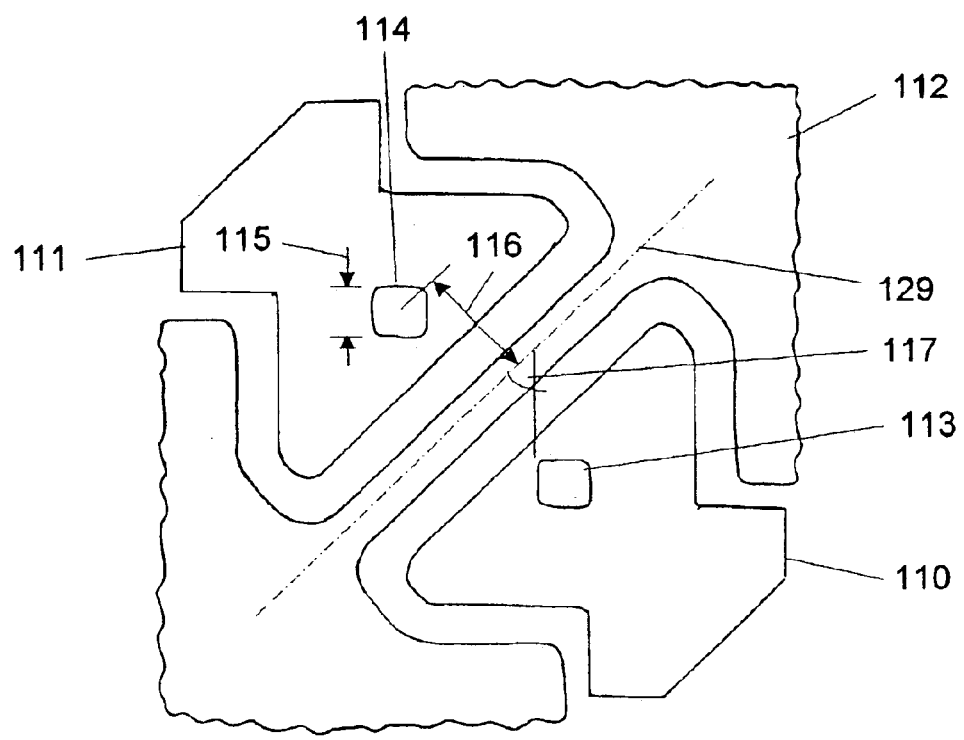
FIG. 2 is a drawing of the metal-3 layer for a single pixel including the positive and negative address electrodes and the landing pad plane for a conventional digital micromirror device, showing the typical size, location, and orientation of the via2 structures.

For reference, FIG. 2 is a drawing of the metal-3 layer for a single pixel including the positive and negative address electrodes 110,111 and the landing pad plane 112 for a conventional digital micromirror device. This shows the typical size, location, and orientation of the via2 structures 113,114. For example, in a typical 17 μm pixel DMD used in many projection displays, the via2 113,114 is nominally 1.5 μm on a side 115 and the via2 is oriented so that the sides are rotated 45° 117 relative to the pixel rotational axis 129, as shown. The center of the via2 is located 3.1 μm 116 from the rotational axis 129.

Figure 3:
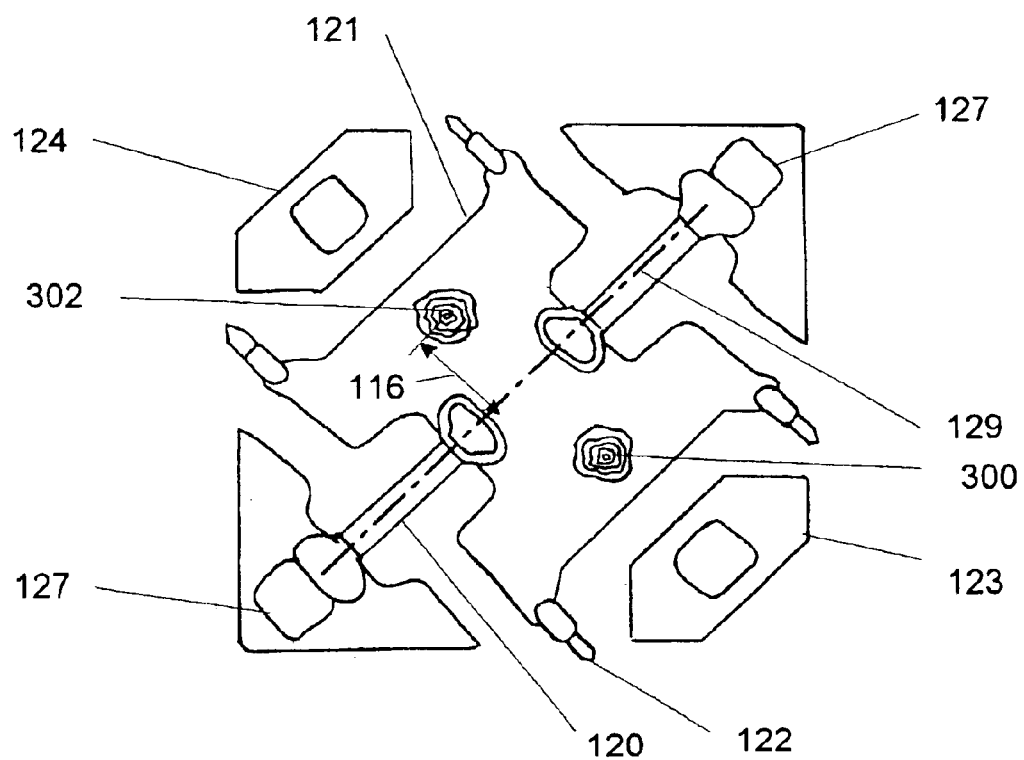
FIG. 3 is a drawing of the rotational beam for a conventional digital micromirror device, showing the relative size of the dimples formed in the beam metal over the via2s.

The via2 structure on the metal-3 layer is translated, through a sacrificial layer that gets removed later, to form dimples in the beam metal as illustrated in FIG. 3. This level is comprised of the beam 121 with its landing tips 122, which is suspended above the metal-3 layer by torsion hinges 120 attached to beam posts 127. The beam posts extend up from the landing pad plane 112 on the metal-3 layer so that the beam and its landing pad are at the same electrical potential. Also shown on this layer are mirror address electrodes 123,124 that aid in creating electrostatic forces for tilting the beam/mirror assembly. In addition, this shows topographical plots for the two dimples 300,302 in the beam metal directly above the via2 structures on the lower metal-3 layer.

These dimples are non-uniformities in the planarity of the beam metal, which extend down from the beam 121 towards the address electrodes 110/111 located on the lower metal-3 layer. The center of the dimples, being directly above the via2s, are also located nominally 3.1 μm 116 from the rotational axis 129.

Figure 4:
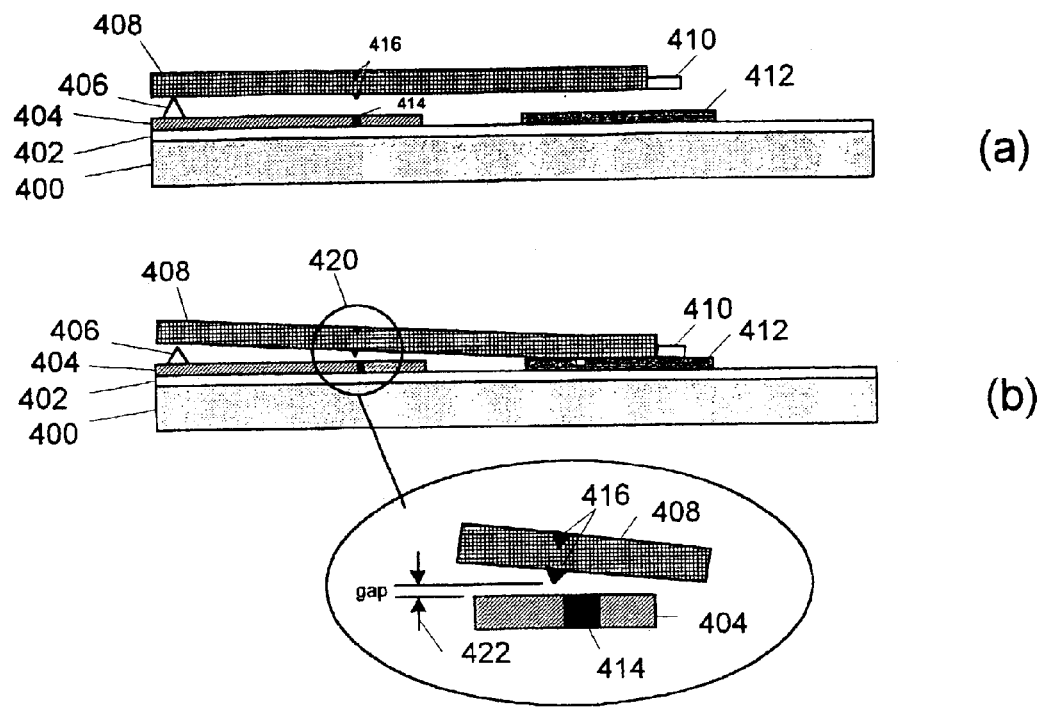
FIGS. 4a, 4b, and 4c are drawings showing a non-tilted beam, a tilted beam, and an expanded view of a portion of the tilted beam, respectively, in a conventional digital micromirror device illustrating the marginal clearance between the beam dimple and the address electrode in the tilted state.

The effects of these dimples are shown in FIG. 4. This figure illustrates the operation of the device. Although in operation the beam tilts in a positive or negative direction, in FIG. 4a shows the beam in a parked (flat) state. This shows an address electrode 404 and the landing pad plane 412 of the metal-3 layer built on top of the memory array 400 with an isolation layer 402 between them. The metal beam is suspended above the metal-3 layer by hinge posts (represented here as a fulcrum 406). Also shown is the via2 structure 414 located in the address electrode and the beam metal dimples 416 in the beam metal. FIG. 4b shows the beam 408 tilted until the beam tip 410 contacts the landing pad 412, causing at times a slight downward bowing in the beam. The expanded drawing 4c of region 420 shows the tilted beam 408 over the address electrode 404 with the dimples 416 coming in close proximity to the address electrode to the side of the via due to rotation, with only a small gap 422 between the two. With process tolerances it is possible for the dimples to become large enough to make contact with the address electrode before the beam tip 410 contacts the landing pad 412. Since the beam 408 and address electrode 404 are at different electrical potentials this causes an electrical short, thereby damaging the device.

Figure 5:
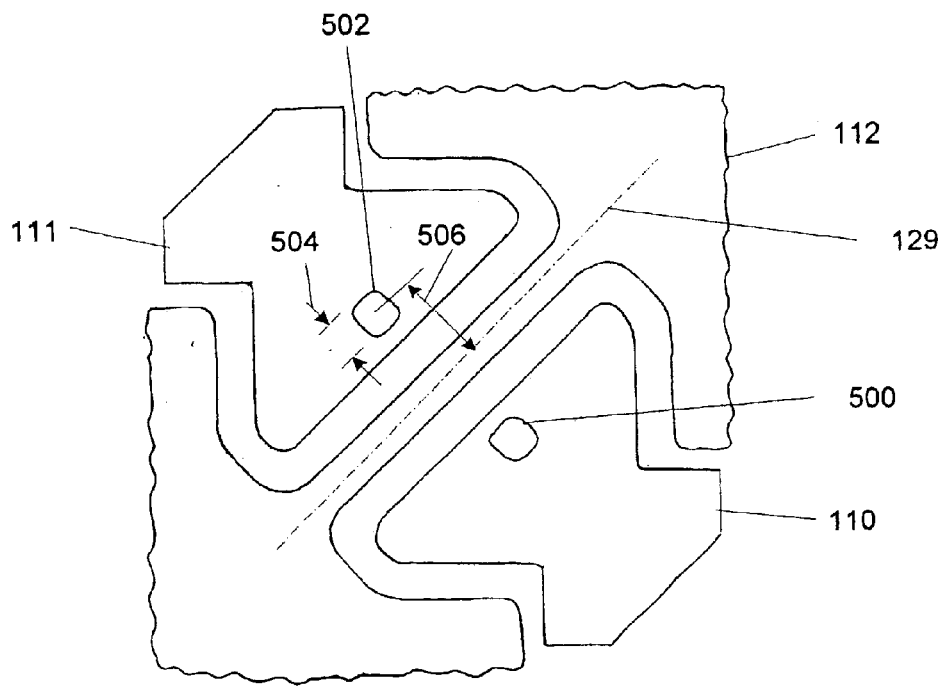
FIG. 5 is a drawing of the metal-3 layer for a single pixel including the positive and negative address electrodes and the landing pad plane for the digital micromirror device of the present invention, showing a smaller via2, the via2 moved closer toward the center of the pixel, and the via2 rotated so that one edge aligns with the rotational axis of the device.

FIG. 5 is a drawing of the metal-3 layer for a single pixel including the positive and negative address electrodes 110, 111 and the landing pad plane 112 for the digital micromirror device of the present invention, showing smaller via2s 500,502, the via being moved closer toward the center of the pixel and rotated so that one edge aligns with the rotational axis of the device. The via2 structure needs to be small to reduce the size of the dimples formed on the beam metal, but there is a practical limit as to how small they can be made. By making the via no larger than 7% on a side relative to the overall pixel size, the dimples can be maintained significantly smaller. For example, for a 17 μm pixel the via2 will be approximately 1.2 μm on a side 504 compared to the typical 1.5 μm. Also, by moving the via2 closer to the center of the device the gap between the dimples and address electrode is increased. For example, by placing the center of the via2 502 a distance 506 from the devices rotational axis 129 no more than 36% of the distance from the axis to the landing tips of the beam, further increases the gap between the dimples and the address electrodes.

Figure 6:
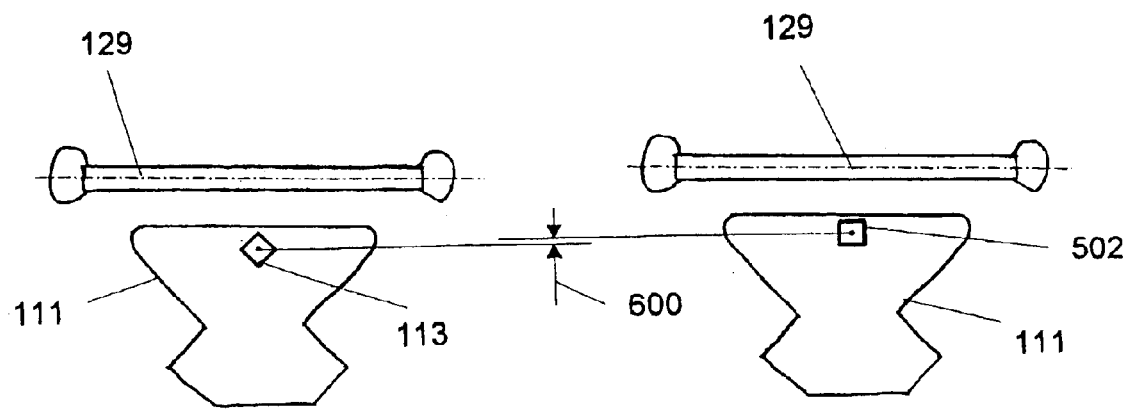
FIGS. 6a and 6b are drawings illustrating the additional increase in clearance between the beam and address electrode, obtained by rotating the via2 structure to optimally align it with the rotational axis of the device.

Since the via2 can be practically located only so close to the edge of the address electrode, an additional improvement can be made by rotating the via2, as shown in FIGS. 6a and 6b. By rotating the conventional via2 113 by 45°, the side of the via2 502 in the present invention is parallel with the rotational axis 129 of the device. This allows the centroid of the via2 to be moved closer to the edge of the address electrode 111 by an amount 600 equal to a factor of 0.707 times the via2 diagonal, thereby indirectly further improving the clearance between the beam dimple and the address electrode.

Figure 7:
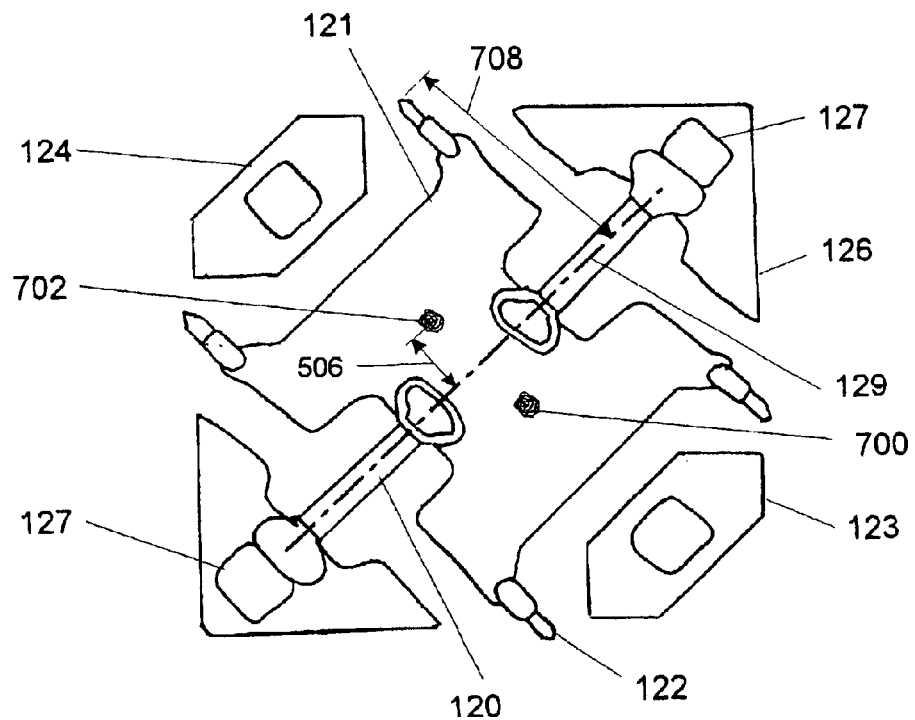
FIG. 7 is a drawing of the rotational beam for the digital micromirror device of the present invention, showing the effect of having smaller dimples formed in the beam metal by optimizing the size, location, and orientation of the via2 structure on the metal-3 layer.

FIG. 7 is a drawing of the rotational beam for the digital micromirror device of the present invention, showing the effect of having smaller dimples formed in the beam metal by optimizing the size, location, and orientation of via2 structures on the metal-3 layer. This is the same beam structure as discussed in FIG. 3, but now the topographical plots 700,702 representing the two dimples are smaller and located a closer distance 506 to the devices rotational axis 129. These dimples are now no greater than 36% of the distance 708 from the axis to the landing tips of the beam.

Figure 8:
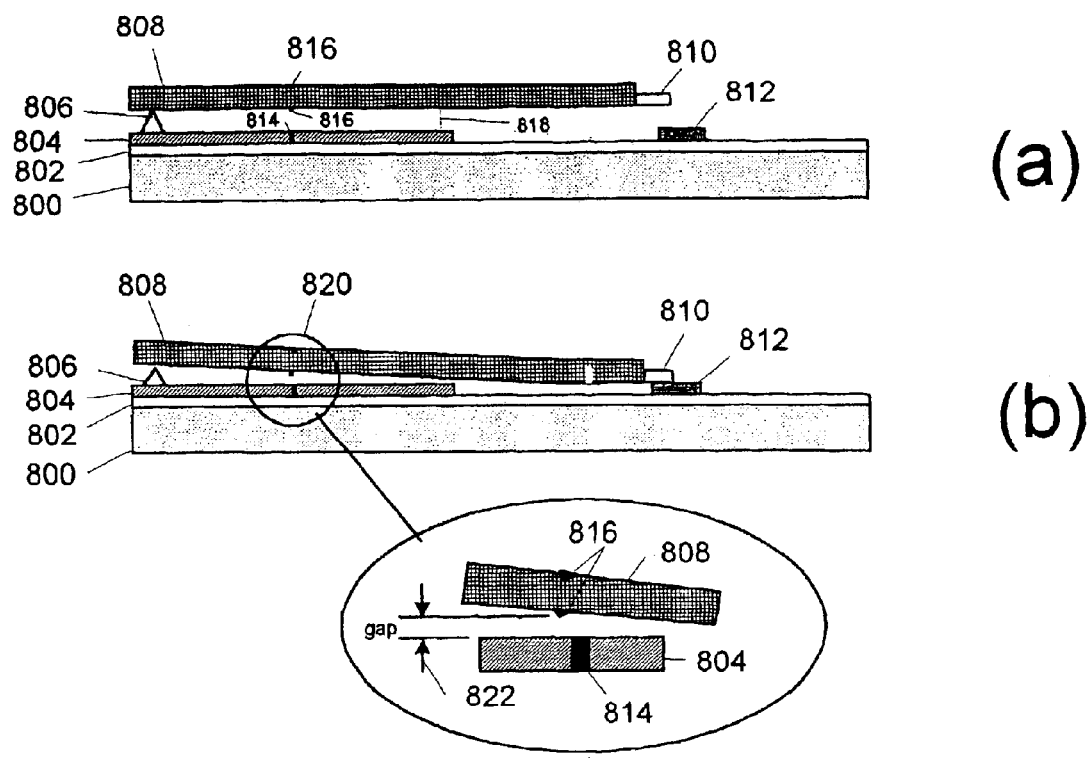
FIGS. 8a, 8b, and 8c are drawings showing a non-tilted beam, a tilted beam, and an expanded view of a portion of the tilted beam, respectively, in the digital micromirror device of the present invention illustrating the increased clearance between the beam dimple and the address electrode in the tilted state.

FIG. 8a is a drawing showing a non-tilted beam in the digital micromirror device of the present invention illustrating the increased clearance between the beam dimple and the address electrode for the tilted state. This diagram is similar to that of FIG. 4a, but now the dimples 816 are smaller, making the gap between the beam 808 and address electrode 804 larger. The height of a dimple from the top of the beam to the bottom of the dimple is no greater that 5.5% of the beam suspension space 818. Also shown are the memory array 800, isolation layer 802, and rotation fulcrum 806.

FIG. 8b shows the beam 808 tilted until the beam tip 810 contacts the landing pad 812, but now the expanded drawing 8c of region 820 shows the tilted beam 808 over the address electrode 804 with the smaller dimples 816 formed over the optimized via2 814 of the present invention, thereby providing a larger gap 822 between the beam 808 and address electrode 804. In this case the dimple height is no more than 5.5% of the suspension space 818 of an un-tilted mirror and the address electrode and the gap 822 between the dimple 816 on a tilted mirror and the address electrode is at least 20% of the suspension space 818, thereby significantly reducing the yield loss in devices due to shorts between the mirrors and underlying address electrodes.

Figure 9:
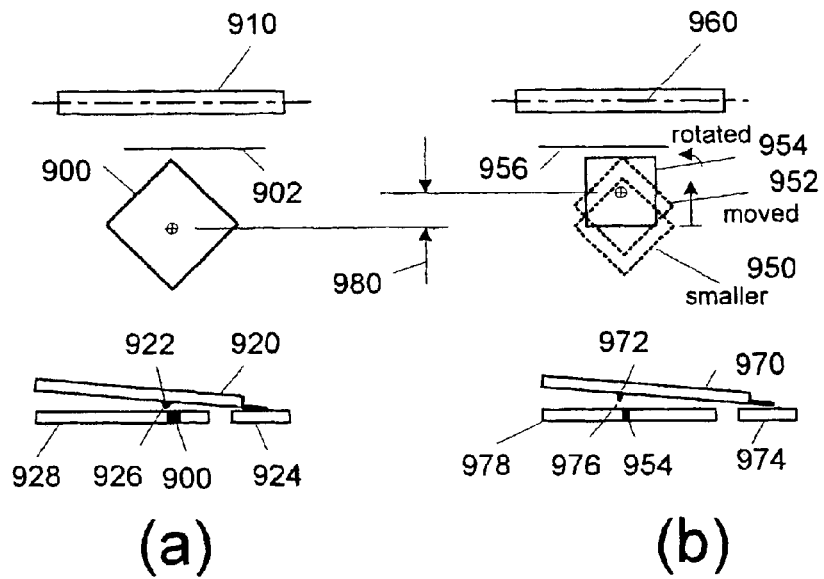
FIGS. 9a and 9b are drawings showing the overall aspects of the present invention; i.e., reducing the beam dimples and increasing the gap between the beam dimples and the address electrode by making the via2 on the metal-3 layer smaller and moving and rotating it.

FIGS. 9a and 9b are drawing summarizing the overall aspects of the present invention; i.e., reducing the beam dimples and increasing the gap between the beam dimples and the address electrode by making the via2 on the metal-3 layer smaller and moving and rotating it. FIG. 9a shows the conventional device with the via2 900 as close to the edge of the address electrode 902 closest to the rotational axis 910 as practically possible. When the beam 920 tilts and contacts the landing pad 924, the gap 926 between the dimple 922 on the beam above the via2 900 located on the metal-3 layer and the address electrode 928 is small, allowing the dimple to come in close proximity to the address electrode 928, which is at a different electrical potential and providing conditions for a possible short under certain process tolerances.

On the other hand, FIG. 9b shows the via2 954 of the present invention, which is smaller 950, moved 952, and rotated 954 resulting in smaller dimples (improved planarity) on the beam. The via2 is reduced in size by making each side no more than 7% of the size of a pixel, moving the via2 toward the center of the device closer to the rotational axis 960 so that the distance from the axis is no more than 36% of the distance from the axis to the landing tip edge of the beam, and rotating the via2 45° so that one side of the via is parallel with the rotational axis. The edge of the via remains the same distance from the edge of the address electrode 956 nearest the device's rotation axis.

This optimization of the via2 structure has the effect of moving the via centroid towards the center of the device by the amount 980. In this case, when the beam 970 tilts and contacts the landing pad 974, the gap 976 between the dimple 972 on the beam above the smaller and repositioned via2 954 located on the metal-3 layer and the address electrode 978 is significantly increased, thereby reducing the possibility of a short.

Figure 10:
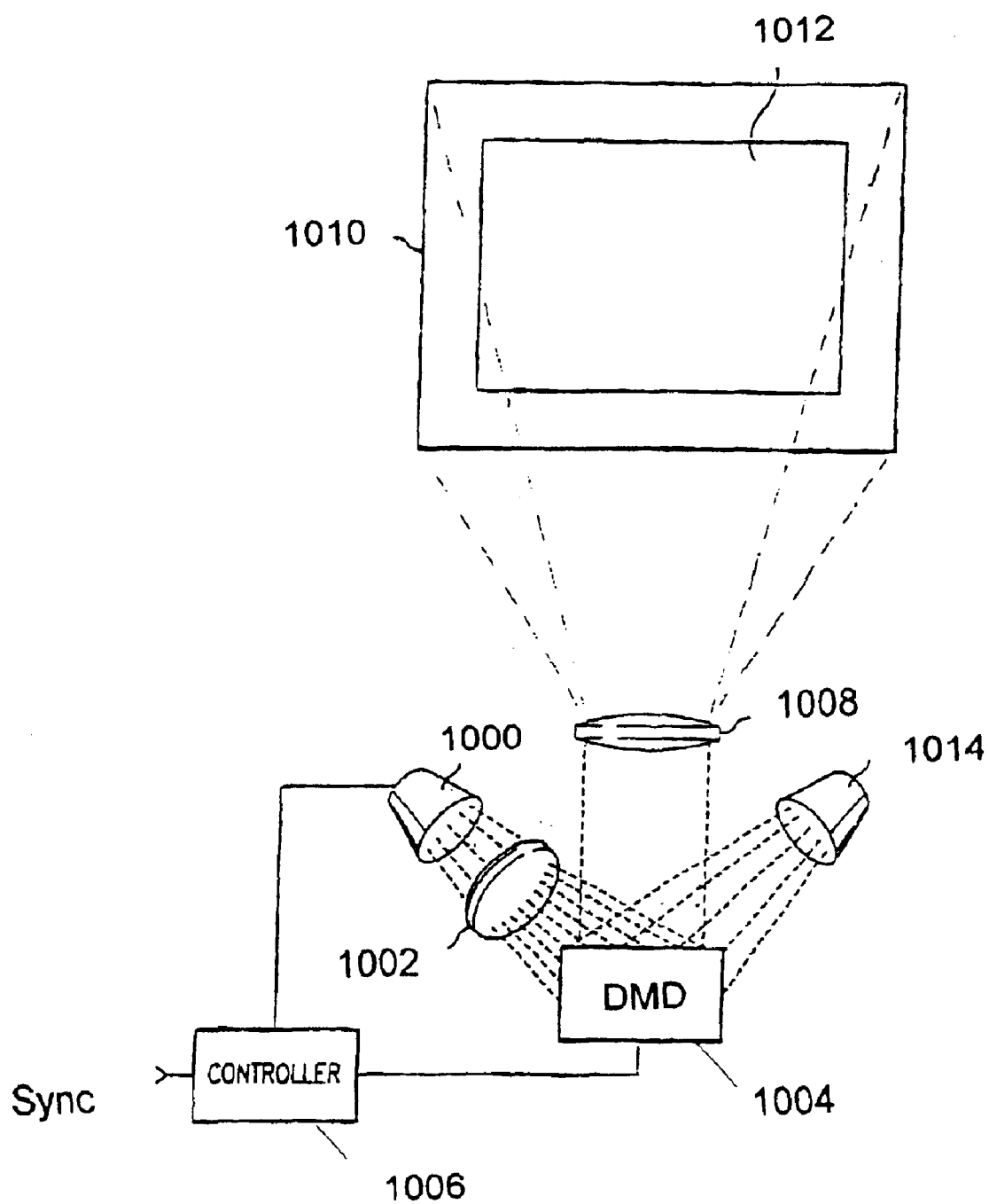
FIG. 10 is a block diagram of a projection display incorporating digital micromirror device(s) of the present invention having increased clearance between the beam and address electrode.

FIG. 10 is a block diagram of a projection display incorporating the digital micromirror device(s) of the present invention having increased clearance between the beam and address electrode. In this display, illumination from a light source 1000 is focused on to the surface of one or more DMD(s) 1004 by means of a condenser lens 1002 placed in the path of the light. An electronic controller 1006 is connected to both the DMD(s) 1004 and the light source 1000 and used to modulate the DMD(s) and to control the light source.

This via2s on the metal-3 layer of this DMD are made smaller, moved closer to the center of the device, and rotated so that one edge of the via is parallel with the rotation axis of the device, all of which results in better planarity in the beam metal above the via2s with smaller dimples hanging down from the beam metal above the via2s. This invention assures that a gap of at least 20% of the suspension space between beam metal and the address electrodes exist when the beam is tilted, thereby significantly reducing the number of shorts between the beam and address electrodes, which are at different electrical potentials.

For all DMD pixels in the ON state, the incoming light beam is reflected into the focal plane of a projection lens 1008, where it is magnified and projected on to a viewing screen 1010 to form an image 1012. On the other hand, DMD pixels in the OFF state, as well as any stray light reflected from various near flat surfaces on and around the DMD, are reflected into a dark trap 1014 and discarded.

While this invention has been described in the context of a preferred embodiment, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A digital micromirror device, comprising:
   a substrate layer, said substrate layer comprised of a pixel memory array;
   an oxide isolation layer on said memory array;
   a metal-3 layer on said oxide layer, said metal-3 layer comprised of an array of positive and negative address electrodes and a beam landing pad plane, said positive and negative address electrodes being connected to respective $Q$ and $\overline{Q}$ outputs of said memory pixels through via2 paths extending through said oxide layer;
   a rotating beam suspended in space above said metal-3 layer by means of two torsion hinges extending from opposite sides of said rotating beam attached to the top end of beam posts, the lower end of said beam posts being attached at opposite corners of said metal-3 landing plane, said suspension space being determined by the height of said beam posts, said beam being addressed by means of said address electrodes to rotate in positive or negative direction until the beam tips contact said landing pads on said metal-3 layer, the minimum gap between said address electrode in the area around said via2 and a tilted beam in the area above said via2 being at least 20% of said suspension space.

2. The digital micromirror device of claim 1, wherein the non-uniformity in planarity in the region of said beam above said via2 is no more than 5.5% peak-to-valley of said suspension space, thereby decreasing the probability of shorting between said beam and said address electrodes.

3. The digital micromirror device of claim 2, wherein said planarity in the region of said beam above said via2 is controlled by:
the size of said via2 on said address electrode;
the placement of said via2 on said address electrode relative to the rotational axis of said beam; and
the rotational orientation of said via2 relative to said rotational axis of said beam.

4. The digital micromirror device of claim 3, wherein a side of said via2 is no larger than 7% of the side of said pixel.

5. The digital micromirror device of claim 3, wherein the center of said via2 on said metal-3 layer is located a distance from said rotational axis no more than 36% of the distance from said axis to the landing tip edge of said beam, said via2 being positioned along a perpendicular line extending from the center of said rotation axis.

6. The digital micromirror device of claim 3, wherein said via2 is rotated to make one side of said via2 parallel with said axis of rotation of said torsion hinge.

7. The digital micromirror device of claim 3, further comprising:
a mirror array, said mirrors being attached by means of mirror posts to the center of each said beam, said mirror extending above said beam and parallel to said beam; and
two mirror address electrodes for each said pixel, located on said beam layer level, said mirror electrodes being extended by metal post above said beam address electrodes, respective said positive and negative beam and mirror address electrodes having electrical connectivity.

8. The digital micromirror device of claim 7, wherein said mirrors, being attached to said beams, rotate through positive and negative angles with said beams without making contact with any other device layers.

9. A projection display system, comprising:
a light source for producing a beam of light along a first light path;
optics inserted in said first light path, said optics providing one or more color light beams;
one or more digital micromirror devices receiving said color light beams from said optics, modulating said light on a pixel-by-pixel basis and reflecting light from ON pixels along a second light path, said digital micromirror further comprising:
a substrate layer, said substrate layer comprised of a pixel memory array;
an oxide isolation layer on said memory array;
a metal-3 layer on said oxide layer, said metal-3 layer comprised of an array of positive and negative address electrodes and a beam landing pad plane, said positive and negative address electrodes being connected to respective $\emph{0}$ and $\emph{1}$ outputs of said memory pixels through via2 paths extending through said oxide layer;
a rotating beam suspended in space above said metal-3 layer by means of two torsion hinges extending from opposite sides of said rotating beam attached to the top end of beam posts, the lower end of said beam posts being attached at opposite corners of said metal-3 landing plane, said suspension space being determined by the height of said beam posts, said beam being addressed by means of said address electrodes to rotate in positive or negative direction until the beam tips contact said landing pads on said metal-3 layer, the minimum gap between said address electrode in the area around said via2 and a tilted beam in the area above said via2 being at least 20% of said suspension space;
control electronics for receiving image data and controlling said light source and the modulation of said digital micromirror device;
projection optics placed in said second light path magnifying and projecting an image on to a viewing screen; and
a light trap for receiving and discarding reflected light along a third light path coming from the OFF pixels on said digital micromirror devices.

10. The projection system of claim 9, wherein the non-uniformity in planarity in the region of said beam above said via2 is no more than 5.5% peak-to-valley of said suspension space, thereby preventing shorting between said beam and said address electrodes.

11. The projection system of claim 10, wherein said planarity in the region of said beam above said via2 is controlled by:
the size of said via2 on said address electrode;
the placement of said via2 on said address electrode relative to the rotational axis of said beam; and
the rotational orientation of said via2 relative to said rotational axis of said beam.

12. The projection system of claim 11, wherein a side of said via2 is no larger than 7% of the side of said pixel.

13. The projection system of claim 11, wherein the center of said via2 on said metal-3 layer is located a distance from said rotational axis no more than 36% of the distance from said axis to the landing tip edge of said beam, said via2 being positioned along a perpendicular line extending from the center of said rotation axis.

14. The projection system of claim 11, wherein said via2 is rotated to make one side of said via2 parallel with said axis of rotation of said torsion hinge.

15. The projection system of claim 11, further comprising:
a mirror array, said mirrors being attached by means of mirror posts to the center of each said beam, said mirror extending above said beam and parallel to said beam; and
two mirror address electrodes for each said pixel, located on said beam layer level, said mirror electrodes being extended by metal post above said beam address electrodes, respective said positive and negative beam and mirror address electrodes having electrical connectivity.

16. The projection system of claim 15, wherein said mirrors, being attached to said beams, rotate through positive and negative angles with said beams without making contact with any other device layers.

* * * * *